(12) United States Patent
Nishioka

(10) Patent No.: US 11,846,770 B2
(45) Date of Patent: Dec. 19, 2023

(54) LIGHT DEFLECTOR AND METHOD FOR CONTROLLING LIGHT DEFLECTOR

(71) Applicant: STANLEY ELECTRIC CO., LTD., Tokyo (JP)

(72) Inventor: Ken Nishioka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 431 days.

(21) Appl. No.: 17/151,711

(22) Filed: Jan. 19, 2021

(65) Prior Publication Data

US 2021/0231946 A1 Jul. 29, 2021

(30) Foreign Application Priority Data

Jan. 23, 2020 (JP) ................................ 2020-008892

(51) Int. Cl.
*G02B 26/10* (2006.01)
*G02B 26/08* (2006.01)
*G02B 26/12* (2006.01)

(52) U.S. Cl.
CPC ....... *G02B 26/101* (2013.01); *G02B 26/0858* (2013.01); *G02B 26/127* (2013.01)

(58) Field of Classification Search
None
See application file for complete search history.

(56) References Cited

U.S. PATENT DOCUMENTS

| 10,080,001 | B2 | 9/2018 | Saito | |
| 2007/0035799 | A1* | 2/2007 | Gomi | G02B 26/105 |
| | | | | 359/213.1 |
| 2018/0231767 | A1* | 8/2018 | Kimura | G02B 26/0858 |

FOREIGN PATENT DOCUMENTS

JP 2017083657 A 5/2017

* cited by examiner

*Primary Examiner* — Jennifer D. Carruth
(74) *Attorney, Agent, or Firm* — Holtz, Holtz & Volek PC

(57) ABSTRACT

A light deflector 130 includes: a control unit 106 configured to generate a resonant drive signal for resonantly driving an MEMS mirror 133, and a non-resonant drive signal for non-resonantly driving the MEMS mirror 133; a resonant sensor 144 configured to detect the resonant drive of the MEMS mirror 133 and generate a resonant sensor signal; and a sensor signal processing unit 103 configured to acquire a phase difference between the resonant drive signal generated by the control unit 106 and the resonant sensor signal, in a case where the MEMS mirror 133 is resonantly driven in a Y-axis direction, also the MEMS mirror 133 is non-resonantly driven in an X-axis direction, and scanning is performed. The control unit 106 calculates an amplitude of the non-resonant drive of the MEMS mirror 133 on the basis of a change in the above phase difference.

7 Claims, 7 Drawing Sheets

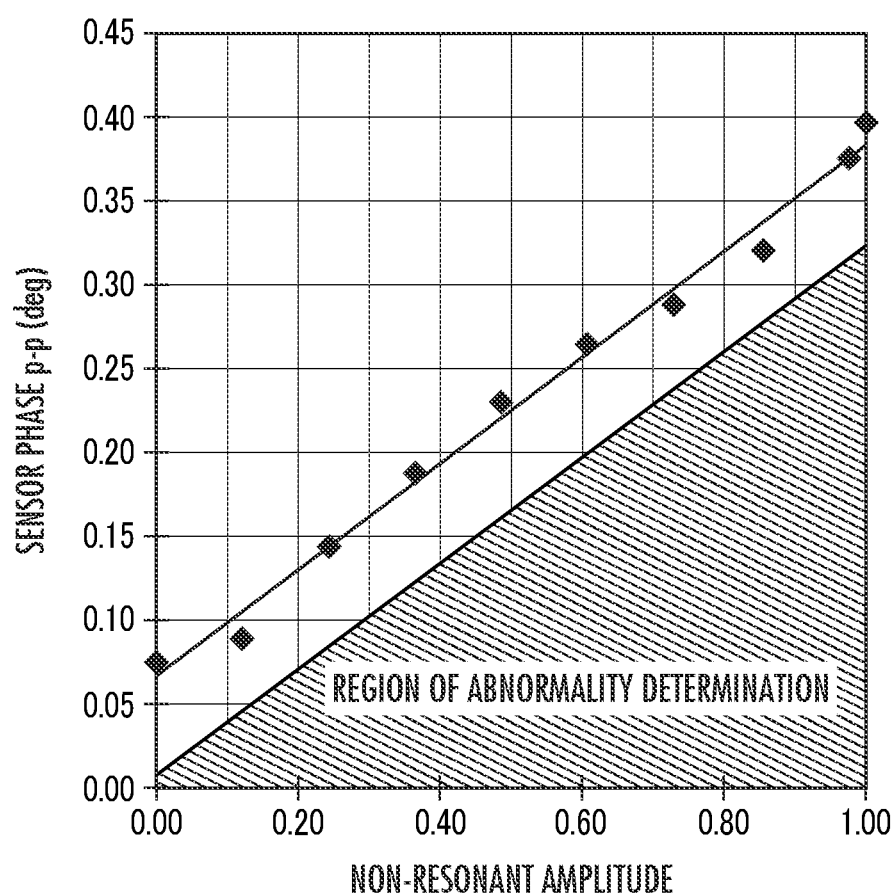

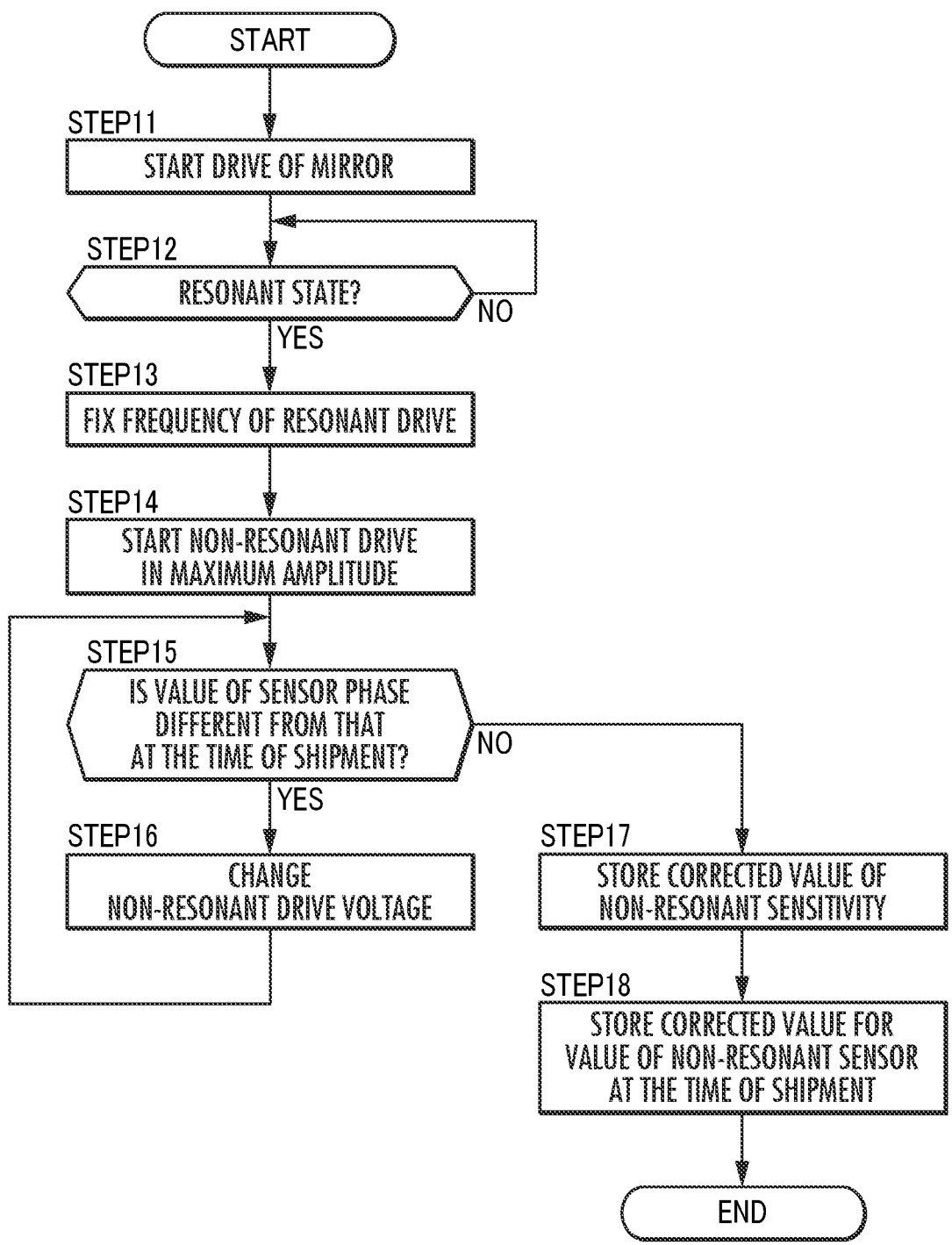

LIGHT DEFLECTOR AND METHOD FOR CONTROLLING LIGHT DEFLECTOR

BACKGROUND OF THE INVENTION

Field of the Invention

The present invention relates to a light deflector which is used for generating a light distribution pattern; and a method for controlling the light deflector.

Description of the Related Art

Conventionally, as a vehicle lamp that is mounted on a vehicle, there is one in which a light deflector such as MEMS (Micro Electro Mechanical Systems) scans light emitted from a light source so that the scanned light passes through a fluorescent substance, and projects the resultant light forward as a light distribution pattern.

For example, in a video projection apparatus disclosed in the following Japanese Patent Laid-Open No. 2017-083657, a light guide and a light receiving element are arranged in a projection range for measuring a deflection angle, in order to detect the deflection angle of an MEMS mirror which the light deflector comprises. In particular, the video projection apparatus detects the deflection angle by using such a mechanism that a difference (period T) from a reference time which has been generated from a voltage signal of a sensor in a horizontal direction (resonance side) of the MEMS mirror to the time at which the light receiving element has detected light changes. (Japanese Patent Laid-Open No. 2017-083657/paragraphs 0052 to 0054, 0061 to 0063, FIG. 7 and FIG. 9).

This structure does not use an amplitude of the voltage signal for detecting the deflection angle of the MEMS mirror, and accordingly, has an advantage of being capable of accurately detecting the deflection angle (amplitude) even when the sensitivity of the sensor has lowered.

In addition, in this video projection apparatus, a drive waveform on a resonance side of the MEMS mirror is a sine wave, and accordingly, it has been possible for the apparatus to measure the maximum deflection angle from the time when light is detected by the light receiving element. However, in the case of a non-resonance side, the MEMS mirror does not always operate according to the drive waveform, and it has been difficult for the apparatus to accurately measure the deflection angle. In addition, another light source for measuring the deflection angle becomes necessary in addition to the light guide and the light receiving element, which has led to an increase in the cost of the apparatus.

The present invention has been made in view of such a situation, and an object of the present invention is to provide a light deflector which can detect an amplitude of the MEMS mirror with a simple configuration.

SUMMARY OF THE INVENTION

A first aspect of the present invention is a light deflector that has a rotary mirror, a first axis which resonantly drives the rotary mirror, and a second axis which is orthogonal to a direction of the first axis and non-resonantly drives the rotary mirror, comprising: a control unit configured to generate a resonant drive signal that is a drive signal for resonantly driving the rotary mirror, and a non-resonant drive signal that is a drive signal for non-resonantly driving the rotary mirror; a first sensor configured to detect the resonant drive of the rotary mirror and generate a detection signal; and a signal processing unit configured to acquire a phase difference between the resonant drive signal generated by the control unit and the detection signal, in a case where the rotary mirror is resonantly driven in a direction of the first axis, also the rotary mirror is non-resonantly driven in a direction of the second axis, and scanning is performed, wherein the control unit calculates an amplitude of the non-resonant drive of the rotary mirror on the basis of a change in the phase difference.

In the light deflector of the present invention, the control unit generates the drive signal for the rotary mirror, and drives the rotary mirror resonantly and (or) non-resonantly. A first sensor is provided so as to detect the resonant drive of the rotary mirror.

In a case where the rotary mirror is non-resonantly driven while being resonantly driven, a resonant frequency changes as compared with the case of only resonant drive, and accordingly the phase difference occurs between the above resonant drive signal and the above detection signal. In the light deflector, the signal processing unit acquires the phase difference, and the control unit calculates the amplitude of the non-resonant drive of the rotary mirror on the basis of a change in the phase difference. When the sensitivity of the first sensor has lowered, the amplitude of the resonant drive decreases in some cases, but the phase difference does not change. Accordingly, the light deflector of the present invention can detect the amplitude of the rotary mirror by checking the change in the phase difference and using the change for control, with a simple configuration.

In the light deflector according to the first aspect of the invention, it is preferable that the above control unit determines that there is an abnormality in a case where the above amplitude of the non-resonant drive based on the above phase difference is smaller than an allowable value with respect to a target amplitude of the non-resonant drive of the above rotary mirror.

According to this configuration, when the rotary mirror is non-resonantly driven, the control unit compares the target amplitude with the amplitude which has been calculated on the basis of the above phase difference; and when the difference is smaller than the allowable value, the control unit determines that the non-resonant drive is abnormal, and executes abnormality processing such as stopping the output of the light source. Thereby, light deflector or an apparatus comprising the light deflector of the present invention can be safely operated.

In the light deflector according to the first aspect of the invention, it is preferable that the above control unit corrects the above non-resonant drive signal according to the amplitude of the non-resonant drive of the above rotary mirror, which has been calculated on the basis of the above phase difference.

According to this configuration, when the rotary mirror is non-resonantly driven, the control unit can estimate the amplitude on the basis of the phase difference, and can correct the non-resonant drive signal as needed. Thereby, in the present invention, it becomes unnecessary to provide a sensor for detecting the non-resonant drive in the second axis and generate the detection signal.

In the light deflector of the first aspect of the invention, it is preferable that the control unit uses a sinusoidal signal as the above non-resonant drive signal, when correcting the above non-resonant drive signal.

The present invention uses the sinusoidal signal as the non-resonant drive signal when correcting the non-resonant drive signal, and thereby can suppress an occurrence of ringing (vibration of the signal).

It is preferable that the light deflector according to the first aspect of the invention further comprises a second sensor which detects the above non-resonant drive of the rotary mirror, and the above control unit corrects the sensitivity of the above second sensor according to the above amplitude of the non-resonant drive of the rotary mirror, which has been calculated on the basis of the above phase difference.

According to this configuration, the light deflector has the second sensor provided therein, and thereby can detect the non-resonant drive of the rotary mirror. In addition, the present invention can calculate the amplitude of the non-resonant drive by a method based on the above phase difference, and accordingly corrects the sensitivity of the second sensor so that the two are matched. Thereby, the present invention can perform calibration in the case where the second sensor has deteriorated, or the like.

In addition, it is preferable that the light deflector of the first aspect of the invention uses a sinusoidal signal as the above non-resonant drive signal when correcting the sensitivity of the above second sensor.

The present invention uses the sinusoidal signal as the non-resonant drive signal when correcting the sensitivity of the second sensor, and thereby can suppress an occurrence of ringing.

A second aspect of the present invention is a method for controlling a light deflector that has a rotary mirror, a first axis which resonantly drives the rotary mirror, and a second axis which is orthogonal to a direction of the first axis and non-resonantly drives the rotary mirror, comprising: a drive signal generation step of generating a resonant drive signal that is a drive signal for resonantly driving the rotary mirror, and a non-resonant drive signal that is a drive signal for non-resonantly driving the rotary mirror; a detection signal generation step in which the first sensor that detects a resonant drive of the rotary mirror generates a detection signal; a phase difference acquisition step of acquiring a phase difference between the resonant drive signal and the detection signal, in a case where the rotary mirror is resonantly driven in a direction of the first axis, also the rotary mirror is non-resonantly driven in a direction of the second axis, and scanning is performed; and a non-resonant amplitude calculation step of calculating an amplitude of the non-resonant drive of the rotary mirror on the basis of a change in the phase difference.

In the method of controlling the light deflector according to the present invention, the control unit generates the drive signal for the rotary mirror, in the drive signal generation step, which resonantly drives and (or) non-resonantly drives the rotary mirror. In addition, the first sensor is provided which detects the resonant drive of the rotary mirror, and accordingly, the detection signal of the resonant drive is generated in the detection signal generation step.

When the rotary mirror is non-resonantly driven while being resonantly driven, a phase difference occurs between the above resonant drive signal and the above detection signal. Then, the phase difference is acquired in the phase difference acquisition step, and the amplitude of the non-resonant drive of the rotary mirror is calculated on the basis of a change in the phase difference, in the non-resonant amplitude calculation step. Accordingly, the method of controlling the light deflector of the present invention checks a change in the phase difference and uses the change in the phase difference for the control, and thereby can control the light deflector with a simple configuration.

BRIEF DESCRIPTION OF THE DRAWINGS

FIG. 6 is a graph showing a relationship between the non-resonant amplitude and a value of a change of the sensor phase, in one cycle of the non-resonant drive; and FIG. 7 is a flow chart for calibrating a non-resonant drive signal and a sensitivity of a non-resonant sensor (second embodiment).

DETAILED DESCRIPTION OF THE PREFERRED EMBODIMENTS

First Embodiment

Figure 1:
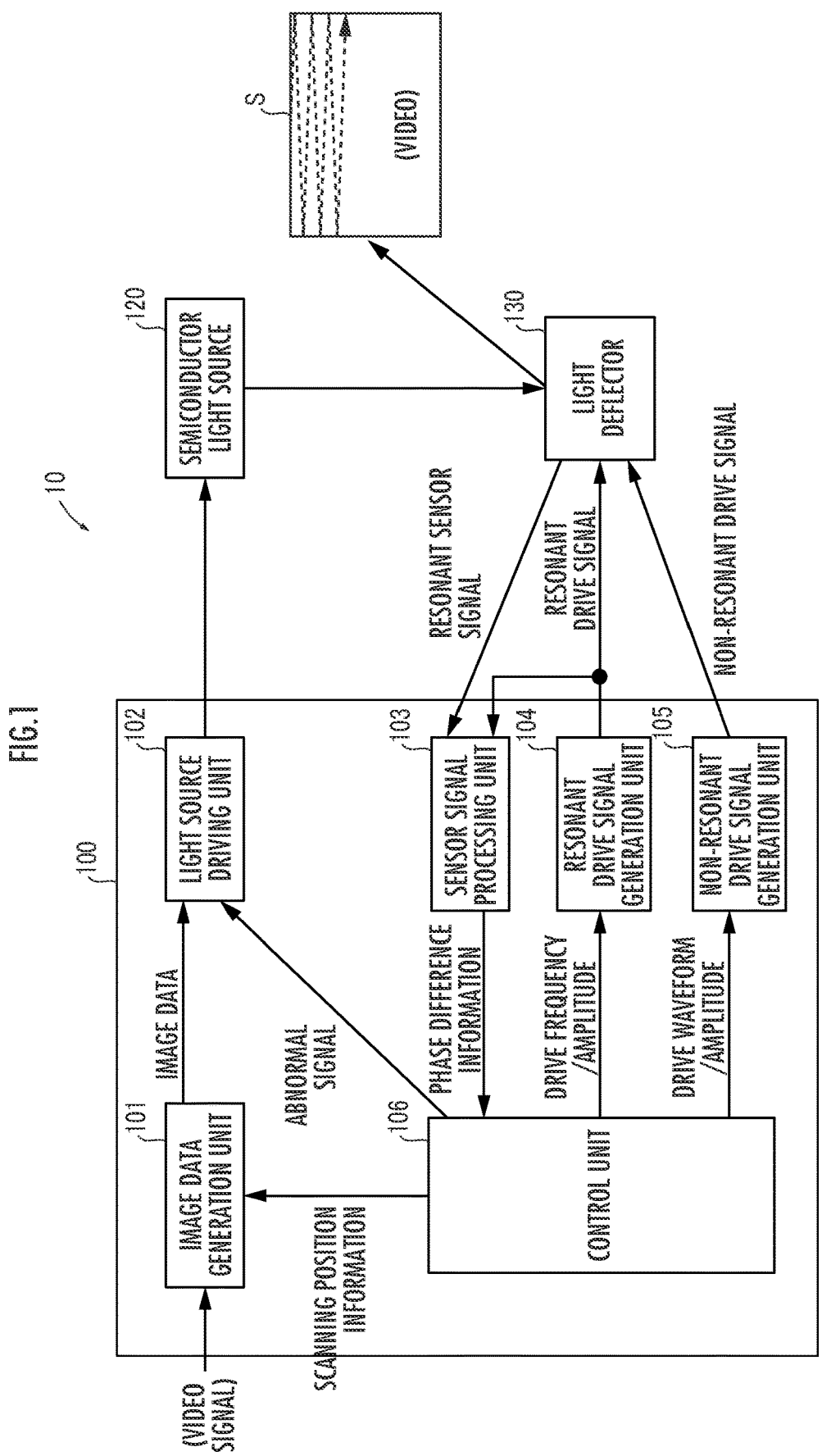
FIG. 1 is a block diagram showing an internal configuration of a lighting apparatus according to a first embodiment.

Firstly, FIG. 1 shows a configuration of an inner part of a lighting apparatus 10 that comprises a light deflector 130 according to the first embodiment of the present invention.

As is shown in the figure, the lighting apparatus 10 mainly includes a control device 100, a semiconductor light source 120 and a light deflector 130. In the lighting apparatus 10, the control device 100 outputs a control signal to the semiconductor light source 120 and the light deflector 130, and causes them to scan light and project a video onto the screen S.

A video signal is input into the control device 100 of the lighting apparatus 10, which has been generated on the basis of a signal that has been output from a video source such as a personal computer or a camera system.

The control device 100 includes: an image data generation unit 101 configured to generate image data; a light source driving unit 102 configured to drive the semiconductor light source 120; a sensor signal processing unit 103 to which a signal (resonant sensor signal) from a sensor is input that outputs a voltage corresponding to a deflection angle of an MEMS mirror 133 ("rotary mirror" of the present invention); a resonant drive signal generation unit 104 configured to output a resonant drive signal to the MEMS mirror 133; a non-resonant drive signal generation unit 105 configured to output a non-resonant drive signal to the MEMS mirror 133; and a control unit 106 configured to receive phase difference information from the sensor signal processing unit 103, and control the semiconductor light source 120 and the light deflector 130.

In the present embodiment, a sinusoidal signal is used as a drive signal of an AC wave that resonantly drives the MEMS mirror 133, but a consinusoidal signal or the like may be used, of which the phase delays by 90 with respect to the sinusoidal drive signal. In addition, a sawtooth wave (triangular wave) drive signal is used as a drive signal of the AC wave for non-resonantly driving the MEMS mirror 133.

The image data generation unit 101 acquires scanning position information from the control unit 106, in order to process the input video signal and generate image data (pixel data). For information, a digital video signal receiver such as an analog RGB receiver, DVI, HDMI (registered trademark) and Display Port is used for inputting the video signal thereinto.

The light source driving unit 102 includes: a high-speed D/A converter which converts a digital signal into an analog signal; and a driver transistor which has a current capacity for driving the semiconductor light source 120. In addition, the light source driving unit 102 performs a process for stopping or reducing the output of the semiconductor light source 120, when having received an abnormal signal from the control unit 106.

When the MEMS mirror 133 has been resonantly driven, the resonant sensor signal is input to the sensor signal processing unit 103, which is sent from the sensor that outputs the voltage corresponding to the deflection angle. The sensor signal processing unit 103 includes: an A/D converter that converts a received analog signal (resonant sensor signal) into a digital signal (phase difference information) which is to be output to the control unit 106; and an operational amplifier that ensures an appropriate level to be input to the A/D converter.

The resonant drive signal generation unit 104 and the non-resonant drive signal generation unit 105 include: a D/A converter that converts a digital signal sent from the control unit 106 into an analog signal, for outputting drive signals to the MEMS mirror 133; and an operational amplifier that amplifies an output signal of the D/A converter to a driving voltage level of the MEMS mirror 133.

The control unit 106 processes the video signal and controls the lighting apparatus 10. The control unit 106 can employ, for example, an FPGA (Field-Programmable Gate Array), a microprocessor, or a hybrid device thereof (EPP: Extensible Processing Platform, or SoC: System on Chip), or the like.

The semiconductor light source 120 is a laser diode (LD: Laser Diode) having a center wavelength of about 450 nm, and emits blue light. In addition, as the light source, light emitting diodes (LEDs: Light Emitting Diodes) that are arranged in parallel may be used, or a laser irradiator ay be used that emits a laser light in which colors are mixed by RGB.

Figure 2:
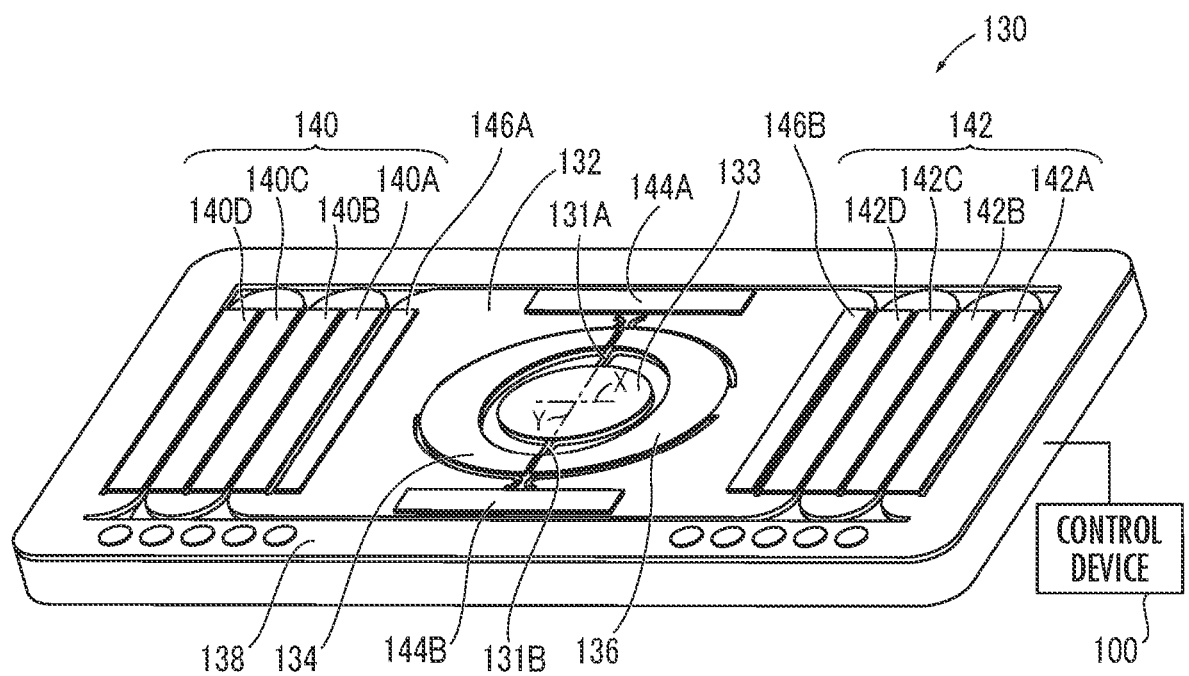
FIG. 2 is a perspective view of a light deflector according to the first embodiment.

Next, the light deflector 130 comprising the MEMS mirror 133 will be described in detail with reference to FIG. 2.

The light deflector 130 is a two axis light deflector that comprises a first support portion 132 for supporting the MEMS mirror 133 by a pair of torsion bars 131A and 1319, first actuators 134 and 136 which drive the MEMS mirror 133 in a main scanning direction (Y axis: "first axis" of the present invention), a second support portion 138 which supports the first support portion 132, and second actuators 140 and 142 which drive the first support portion 132 in a sub-scanning direction (X axis: "second axis" of the present invention) with respect to the second support portion 138; and that can perform two dimensional scanning.

In the lighting apparatus 10 comprising the light deflector 130, the semiconductor light source 120 illuminates so that only an area to be drawn in a range in which the video is projected is irradiated with light by two dimensional scanning, and accordingly, the use efficiency of light can be enhanced.

The actuator of the light deflector 130 can employ a piezoelectric type, an electrostatic type, or an electromagnetic type of actuator. In the present embodiment, the piezoelectric actuator is employed as the actuators 134 and 136. In addition, each of the actuators 140 and 142 includes four piezoelectric cantilevers which are connected to each other. Each of the piezoelectric cantilevers 140A to 140D and 142A to 142D includes a stacked body including a support, a lower electrode, a piezoelectric body and an upper electrode.

A video based on a video signal is projected by high-speed scanning in a horizontal direction and low-speed scanning in a vertical direction. Because of this, the MEMS mirror 133 is rotated in a main scanning direction by the resonant drive of the actuators 134 and 136 corresponding to the high-speed operation, and is rotated in a sub-scanning direction by the non-resonant drive of the actuators 140 and 142 corresponding to the low-speed operation.

In order to detect a rotating state of the MEMS mirror 133, resonant sensors 144A and 144B (which are "first sensors" of the present invention, and hereinafter will be referred to as a resonant sensor 144) are provided at roots of the torsion bars 131A and 131B, on the first support portion 132. In addition, non-resonant sensors 146A and 146B (which are "second sensors" of the present invention, and hereinafter, will be referred to as a non-resonant sensor 146) are provided in vicinity of the actuators 140 and 142.

As these sensors, a sensor can be employed which uses a piezoelectric effect or uses a piezoresistive effect. The sensor using the piezoelectric effect operates as a speed sensor which returns a differential value of the amount of displacement of the deflection angle of the MEMS mirror 133. On the other hand, the sensor using the piezoresistive effect operates as a position sensor which returns a value proportional to the amount of displacement of the deflection angle of the MEMS mirror 133.

In addition, it is preferable to use an actuator and a sensor using the piezoelectric effect in regard that the stacked structures of the actuator and the sensor can be formed in the same production process.

In addition, as for the resonant sensor 144 and the non-resonant sensor 146, it is preferable that at least one each is provided. In order to enhance the stability of drives of the MEMS mirror 133 in the main scanning direction and the sub-scanning direction, and a noise canceling effect of the differential signal, as shown in FIG. 2, it is more preferable to provide two of the resonant sensors 144 and the non-resonant sensors 146 symmetrically with respect to the Y axis and the X axis, respectively.

Figure 3:
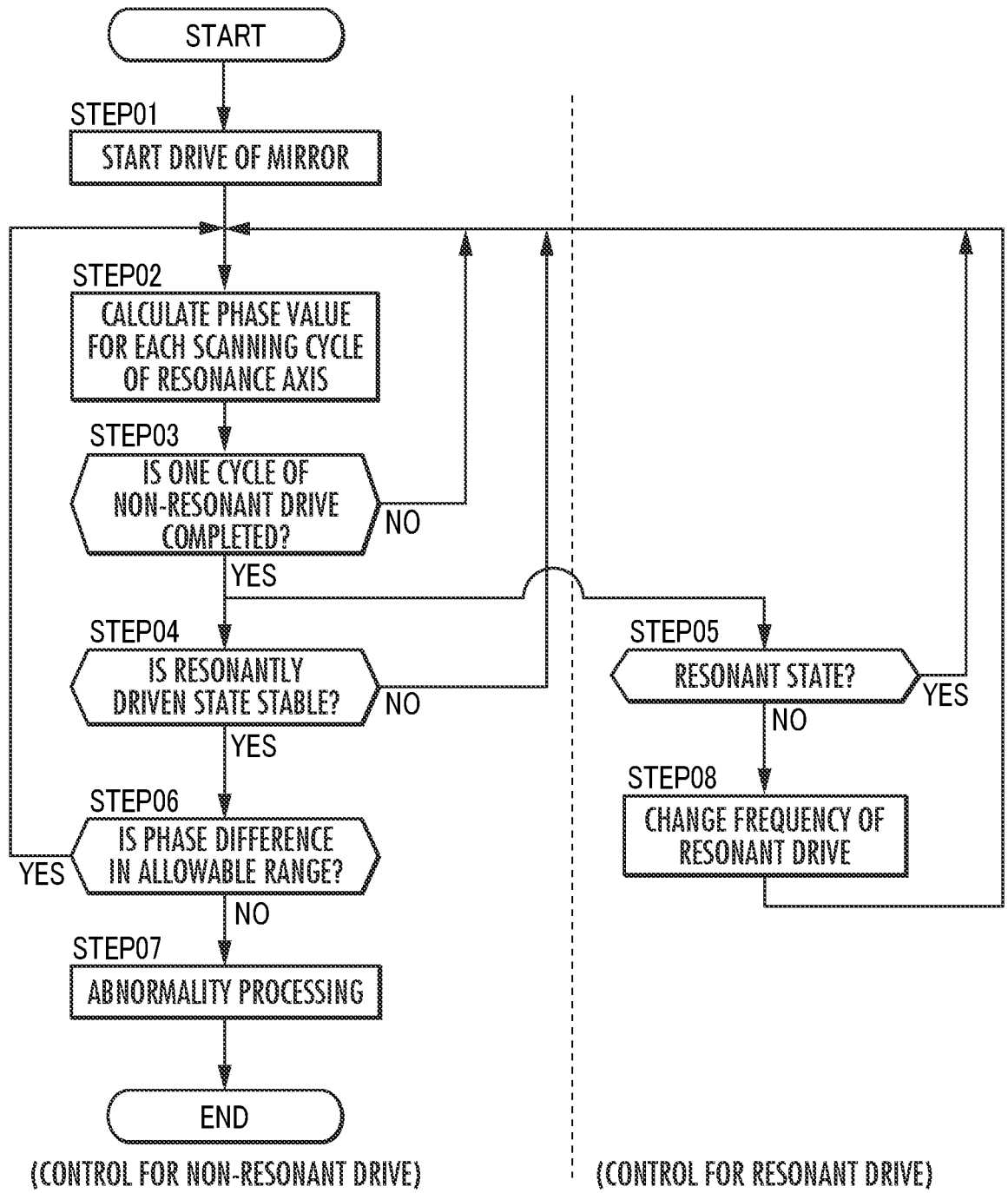
FIG. 3 is a flow chart for calculating an amplitude of a non-resonant drive of an MEMS mirror.

Next, a flow chart of calculating an amplitude of the non-resonant drive of the MEMS mirror 133 will be explained with reference to FIG. 3.

Firstly, the lighting apparatus 10 starts the drive of the MEMS mirror 133 in the light deflector 130 (STEP 01), Here, the lighting apparatus 10 further starts the non-resonant drive in the sub-scanning direction (X-axis direction), in a state where the MEMS mirror 133 is resonantly driven in the main scanning direction (Y-axis direction).

Next, the lighting apparatus 10 calculates phase differences for each scanning cycle of the resonance axis (STEP 02). At this time, the frequency of the resonant drive is set to be constant. In addition, the phase difference here refers to a phase difference between a resonant drive signal that is generated on the basis of a drive frequency and an amplitude which are generated in the control unit 106, and a resonant sensor signal ("detection signal" of the present invention) which is obtained from the resonant sensor 144.

Figure 4:
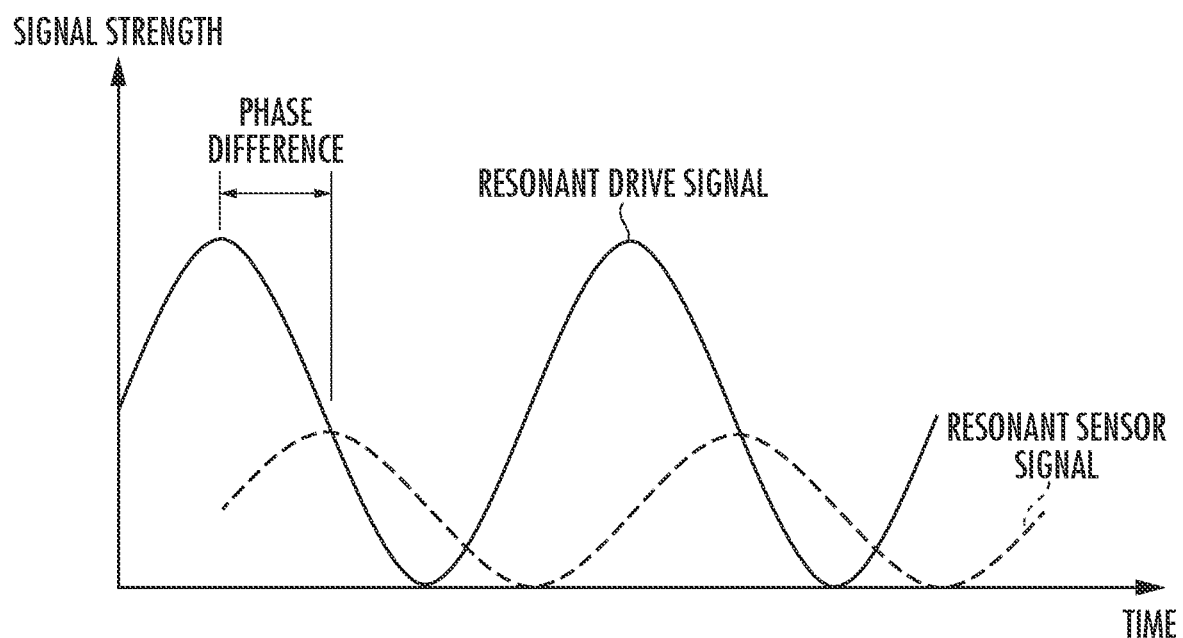
FIG. 4 is a view explaining a phase difference between a resonant drive signal and a resonant sensor signal.

In FIG. 4, a solid line indicates the resonant drive signal, and a broken line indicates the resonant sensor signal. As is shown in the figure, the phase difference is the difference between the peaks of both signals (sensor phase p-p). In a case where the MEMS mirror 133 is further non-resonantly driven in a state in which the MEMS mirror 133 is resonantly driven, the rigidity of the MEMS mirror 133 changes, and accordingly, a resonant frequency changes as compared with the case of only the resonant drive. Because of this, a predetermined phase difference occurs between the resonant drive signal and the resonant sensor signal. In other words, this phase difference is caused by the non-resonant drive of the MEMS mirror 133.

Figure 5:
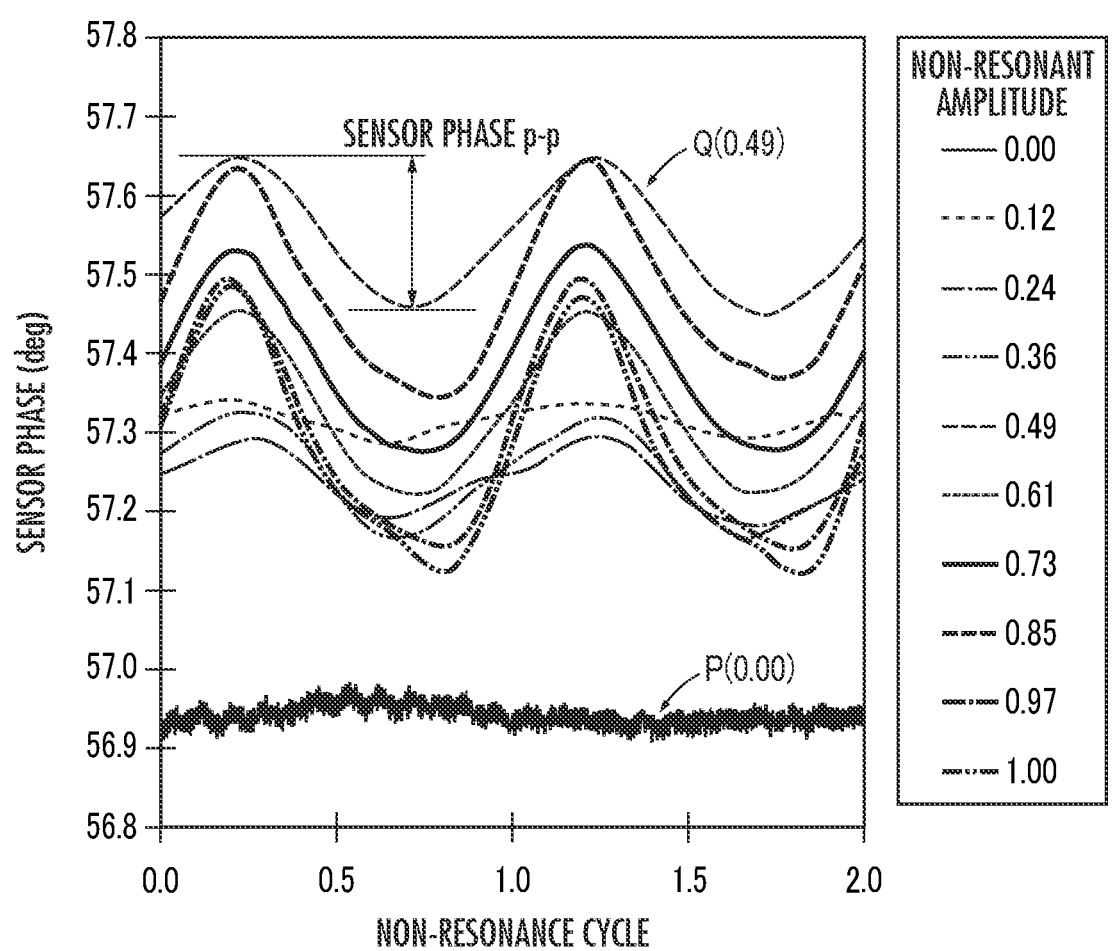
FIG. 5 is a view explaining a sensor phase when the MEMS mirror is non-resonantly driven.

In addition, FIG. 5 shows sensor phases when the MEMS mirror 133 is non-resonantly driven while being resonantly driven. As is shown in the figure, the sensor phase (vertical axis) changes in accordance with the non-resonance cycle (horizontal axis), and the amplitude thereof (sensor phase p-p) depends on the magnitude of the non-resonant amplitude.

For example, a waveform P is that in the case where the non-resonant amplitude is 0.00, and in this case, the sensor phase is about 59.6 (deg), and the sensor phase p-p is about 0.03 (deg), which are extremely small. In addition, the waveform Q is that in a case where the non-resonant amplitude is 0.49, and in this case, the sensor phase p-p is about 0.20 (deg). For information, the non-resonant amplitude (0.00 to 1.00) is a ratio (normalized value) at the time when the maximum amplitude is defined as 1.

Next, the lighting apparatus 10 determines whether or not one cycle of the non-resonant drive of the MEMS mirror 133 has been completed (STEP 03), When the one cycle has been completed, the process proceeds to STEP 04, and when one cycle has not been completed yet, the process returns to STEP 02 (loop until one cycle is completed).

When one cycle of the non-resonant drive has been completed ("YES" in STEP 03), the lighting apparatus 10 determines whether or not the MEMS mirror 133 is stabilized in a resonantly driven state (STEP 04). When the MEMS mirror 133 has become stable in the resonantly driven state, the process proceeds to STEP 06, and when the MEMS mirror 133 is still unstable in the resonantly driven state, the process returns to STEP 02 (loop until the resonantly driven state is maintained).

When the MEMS mirror 133 has become stable in the resonantly driven state ("YES" in STEP 04), the lighting apparatus 10 determines whether or not the amplitude of the non-resonant drive, which has been calculated on the basis of the phase difference, is in an allowable range with respect to the target amplitude of the non-resonant drive (STEP 06). When the above phase difference is in an allowable range, the process returns to STEP 02, and when the phase difference is out of the allowable range, the process proceeds to STEP 07.

When the phase difference is out of the allowable range ("NO" in STEP 06), abnormality processing is performed (STEP 07). In this case, it is considered that the MEMS mirror 133 does not reach a desired amplitude, and accordingly, the lighting apparatus 10 controls the semiconductor light source 120 so as to turn off the laser light or reduce the output so that the output satisfies a safety standard. For information, the allowable value here is a value of the phase difference of a larger amplitude between an amplitude range which satisfies the safety standard of the semiconductor light source 120 and an amplitude range at the time when the semiconductor light source 120 has been driven only by the non-resonant drive.

FIG. 6 is a graph showing a relationship between the non-resonant amplitude and a value of a change (sensor phase p-p) of the sensor phase, in one cycle of the non-resonant drive. When the values of the change of the sensor phase are plotted against the non-resonant amplitudes in FIG. 5, a linear relationship is obtained. In addition, the calibration of the non-resonant sensor 146, which will be described later, uses the slope of the straight line.

In addition, a region far below the straight line in the figure is a region (hatched portion) of abnormality determination. It is possible to determine whether or not the non-resonant amplitude of the MEMS mirror 133 is normal, on the basis of the characteristics of FIG. 6, by checking the value of the change of the sensor phase with respect to the target non-resonant amplitude.

When one cycle of the non-resonant drive has been completed ("YES" in STEP 03), the lighting apparatus 10 also determines whether or not the MEMS mirror 133 is in a resonant state (STEP 05). The lighting apparatus 10 determines whether or not the resonant state is stable, from a change of the amplitude of the resonant sensor 144 and an elapsed time period. When the resonant state is stable, the process returns to STEP 02, and when the resonant state is still unstable, the process proceeds to STEP 08.

When the resonant state is unstable ("NO" in STEP 05), the lighting apparatus 10 changes a frequency of the resonant drive (STEP 08). Specifically, when an average value of the phase difference or the range of the phase difference in one cycle of the non-resonant drive has exceeded the allowable range as compared with the sensor phase at the time of the resonant drive, the lighting apparatus 10 changes the frequency of the resonant drive.

In this way, the frequency of the resonant drive gives influence on the value of the change of the sensor phase until the MEMS mirror 133 is stabilized in the resonant state, in some cases, the lighting apparatus 10 does not perform the abnormality determination (STEP 06) of the non-resonant drive, and performs the measurement again. With that, a series of processes for detecting the amplitude of the non-resonant drive of the MEMS mirror 133 ends.

As shown in the flow chart (FIG. 3), the lighting apparatus 10 detects the amplitude of the non-resonant drive of the MEMS mirror 133, by using the phase difference of the resonant sensor signal and the resonant drive signal. Even if the sensitivity of the resonant sensor 144 lowers, the phase difference is not affected (though the amplitude decreases due to deterioration, in some cases). Because of this, the lighting apparatus 10 can obtain high reliability, and enables the determination even when the value of the non-resonant amplitude has changed. In addition, the lighting apparatus 10 uses the resonant sensor 144 which is originally attached to the light deflector 130, and accordingly, it is not necessary to newly prepare a light source or a detector for detecting the amplitude, which is advantageous also in terms of the cost.

Second Embodiment

Next, a flow chart of calibrating the sensitivity of the non-resonant drive signal or the non-resonant sensor will be explained with reference to FIG. 7.

Normally, a sawtooth wave signal is used as the non-resonant drive signal of the MEMS mirror 133, accordingly a harmonic component included in the drive waveform coincides with the resonant frequency of the non-resonant drive, and ringing (vibration of signal) occurs in an actual behavior, in some cases. Because of this, it is necessary to calibrate the sensitivity of the non-resonant drive signal or the non-resonant sensor 146, and remove the ringing. For this calibration, such a fact is used that the amplitude of the non-resonant drive of the MEMS mirror 133 is obtained from the detection signal of the resonant sensor 144, which has been described in the first embodiment.

Firstly, the lighting apparatus 10 starts the drive of the MEMS mirror 133 (STEP 11). Here, the lighting apparatus 10 resonantly drives the MEMS mirror 133 in the main scanning direction (Y-axis direction).

Next, the lighting apparatus 10 determines whether or not the MEMS mirror 133 is in a resonant state (STEP 12). When the MEMS mirror 133 has become stable in the resonant state, the process proceeds to STEP 13, and when the MEMS mirror is still unstable, the process loops until the MEMS mirror becomes stable.

When the MEMS mirror 133 has become stable in the resonant state ("YES" in STEP 12), the lighting apparatus 10 fixes the frequency of the resonant drive of the MEMS mirror 133 (STEP 13), and further starts the non-resonant drive by the maximum amplitude of the MEMS mirror 133 (STEP 14).

After that, the lighting apparatus 10 determines whether or not a value of the sensor phase of the resonant sensor 144 in one cycle of the non-resonant drive is different from that at the time of shipment (STEP 15). When the value of the sensor phase is different from that at the time of shipment (initial value), the process proceeds to STEP 16, and when the value of the sensor phase is the same as that at the time of shipment, the process proceeds to STEP 17.

When the value of the sensor phase is different from that at the time of shipment ("YES" in STEP 15), the lighting apparatus 10 changes a non-resonant drive voltage (non-resonant drive signal) (STEP 16). Specifically, the lighting apparatus 10 changes the value of the sensor phase so as to become the same value as that at the tithe of shipment, and the process returns to STEP 15 (loop until the value of the sensor phase becomes the same value as that at the time of shipment).

On the other hand, when the value of the sensor phase is the same as that at the time of shipment ("NO" in STEP 15), the lighting apparatus 10 stores the corrected value of non-resonant sensitivity (STEP 17), and further stares the corrected value for the values of a non-resonant sensor 146 at the time of shipment (STEP 18). With that, a series of processes relating to the calibration of the non-resonant drive signal or the non-resonant sensor ends.

From the results of the long-term reliability evaluation in the past, the non-resonant sensor 146 which is the sensor of the second actuators 140 and 142 degrades faster than the resonant sensor 144. Accordingly, it is necessary to execute the above flow chart (FIG. 7) and calibrate the non-resonant drive signal or the non-resonant, sensor. For information, at the time of the calibration, a sinusoidal signal may be used as the non-resonant drive signal. Thereby, the occurrence of the ringing (vibration of signal) can be suppressed.

In the light deflector 130 (see FIG. 2) of the first embodiment, the non-resonant sensor 146 has been provided. However, the amplitude information of the non-resonant drive can be acquired even without the non-resonant sensor 146, accordingly which is not an essential configuration. On the other hand, in the second embodiment, the sensitivity of the non-resonant sensor 146 is corrected by the amplitude which is obtained from the sensor phase signal of the resonant sensor 144, and accordingly, it is predicated that the light deflector 130 includes the non-resonant sensor 146.

The light deflector 130 in the above embodiment is mainly used in a lighting apparatus of a vehicle head lamp, but can also be applied to a laser scanning projector (video projection apparatus), a distance measuring device, a scanning microscope, and the like.

REFERENCE SIGNS FIRST

10 . . . lighting apparatus, 100 . . . control device, 101 . . . image data generation unit, 102 . . . light source driving unit, 103 . . . sensor signal processing unit, 104 . . . resonant drive signal generation unit, 105 . . . non-resonant drive signal generation unit, 106 . . . control unit, 120 . . . semiconductor light source, 130 . . . light deflector, 133 . . . MEMS mirror, 134 and 136 . . . first actuator, 140 and 142 . . . second actuator, 144, 144A and 144B . . . resonant sensor, and 146, 146A and 146B . . . non-resonant sensor.

What is claimed is:

1. A light deflector having a rotary mirror, a first axis which resonantly drives the rotary mirror, and a second axis which is orthogonal to a direction of the first axis and non-resonantly drives the rotary mirror, the light deflector comprising:
a control unit configured to generate a resonant drive signal that is a drive signal for resonantly driving the rotary mirror, and a non-resonant drive signal that is a drive signal for non-resonantly driving the rotary mirror;
a first sensor configured to detect the resonant drive of the rotary mirror and generate a detection signal; and
a signal processing unit configured to acquire a phase difference between the resonant drive signal generated by the control unit and the detection signal, in a case where the rotary mirror is resonantly driven in a direction of the first axis, also the rotary mirror is non-resonantly driven in a direction of the second axis, and scanning is performed,
wherein the control unit calculates an amplitude of the non-resonant drive of the rotary mirror based on a change in the phase difference, and
wherein the control unit corrects the non-resonant drive signal according to the amplitude of the non-resonant drive of the rotary mirror, which has been calculated based on the phase difference.

2. The light deflector according to claim 1, wherein the control unit determines that there is an abnormality in a case where the amplitude of the non-resonant drive of the rotary mirror, which has been calculated based on the phase difference, is smaller than an allowable value with respect to a target amplitude of the non-resonant drive of the rotary mirror.

3. The light deflector according to claim 1, wherein the control unit uses a sinusoidal signal as the non-resonant drive signal, when correcting the non-resonant drive signal.

4. A light deflector having a rotary mirror, a first axis which resonantly drives the rotary mirror, and a second axis which is orthogonal to a direction of the first axis and non-resonantly drives the rotary mirror, the light deflector comprising:
a control unit configured to generate a resonant drive signal that is a drive signal for resonantly driving the rotary mirror, and a non-resonant drive signal that is a drive signal for non-resonantly driving the rotary mirror;
a first sensor configured to detect the resonant drive of the rotary mirror and generate a detection signal;
a signal processing unit configured to acquire a phase difference between the resonant drive signal generated by the control unit and the detection signal, in a case where the rotary mirror is resonantly driven in a direction of the first axis, also the rotary mirror is non-resonantly driven in a direction of the second axis, and scanning is performed; and
a second sensor that detects the non-resonant drive of the rotary mirror, wherein the control unit calculates an amplitude of the non-resonant drive of the rotary mirror based on a change in the phase difference, and wherein the control unit corrects a sensitivity of the second sensor according to the amplitude of the non-resonant drive of the rotary mirror, which has been calculated based on the phase difference.

5. The light deflector according to claim 4, wherein the control unit uses a sinusoidal signal as the non-resonant drive signal, when correcting the sensitivity of the second sensor.

6. The light deflector according to claim 4, wherein the control unit determines that there is an abnormality in a case where the amplitude of the non-resonant drive of the rotary mirror, which has been calculated based on the phase difference, is smaller than an allowable value with respect to a target amplitude of the non-resonant drive of the rotary mirror.

7. A method for controlling a light deflector that has a rotary mirror, a first axis which resonantly drives the rotary mirror, and a second axis which is orthogonal to a direction of the first axis and non-resonantly drives the rotary mirror, the method comprising:

a drive signal generation step of generating a resonant drive signal that is a drive signal for resonantly driving the rotary mirror, and a non-resonant drive signal that is a drive signal for non-resonantly driving the rotary mirror;

a detection signal generation step in which the first sensor detects a resonant drive of the rotary mirror and generates a detection signal;

a phase difference acquisition step of acquiring a phase difference between the resonant drive signal and the detection signal, in a case where the rotary mirror is resonantly driven in a direction of the first axis, also the rotary mirror is non-resonantly driven in a direction of the second axis, and scanning is performed; and a non-resonant amplitude calculation step of calculating an amplitude of the non-resonant drive of the rotary mirror based on a change in the phase difference.

\* \* \* \* \*